March 4, 1969 J. S. MELLOTT ET AL Re. 26,535
LIVE DECK AND LOADER ASSEMBLY
Original Filed June 18, 1965 Sheet 1 of 2
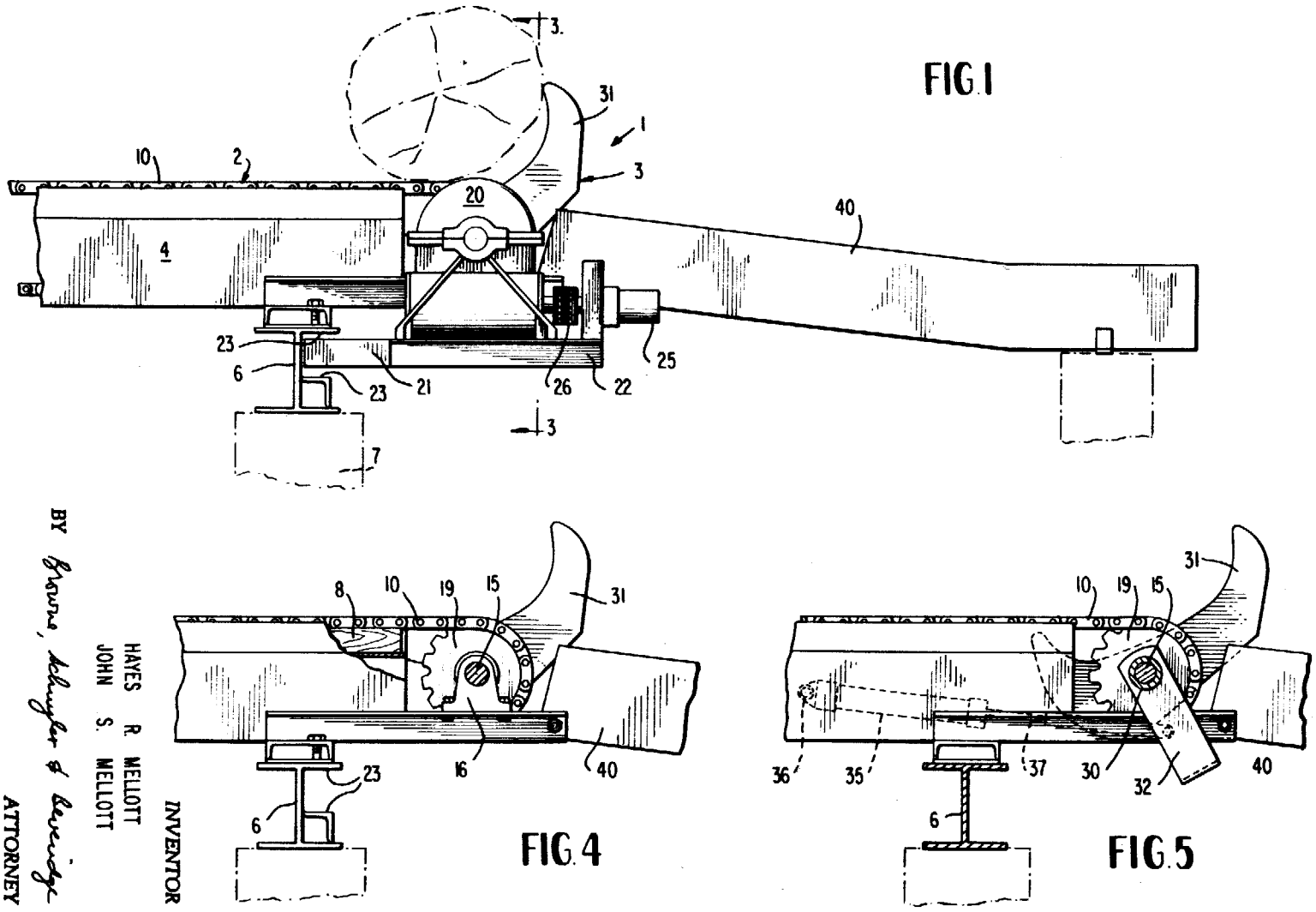
INVENTOR
HAYES R. MELLOTT
JOHN S. MELLOTT
BY Browne, Schuyler & Beveridge
ATTORNEY

LIVE DECK AND LOADER ASSEMBLY

Original Filed June 18, 1965

INVENTORS
HAYES R. MELLOTT
JOHN S. MELLOTT
BY Browne, Schuyler & Beveridge
ATTORNEYS United States Patent Office Re. 26,535
Reissued Mar. 4, 1969

26,535

LIVE DECK AND LOADER ASSEMBLY

John S. Mellott and Hayes R. Mellott, both of Rte. 1, Box 97, Mercersburg, Pa. 17236

Original No. 3,355,042, dated Nov. 28, 1967, Ser. No. 465,069, June 18, 1965. Application for reissue Apr. 18, 1968, Ser. No. 724,324
U.S. Cl. 214—91 5 Claims
Int. Cl. B66b *17/14*

Matter enclosed in heavy brackets [ ] appears in the original patent but forms no part of this reissue specification; matter printed in italics indicates the additions made by reissue.

ABSTRACT OF THE DISCLOSURE

A live deck and stop and loader assembly for conveying logs to a saw mill and feeding the logs one at a time onto the carriage of the saw mill. The stop and loader mechanism is mounted on the main drive shaft of the live deck, and separate power drives are provided to operate the live deck and the stop and loader mechanisms independently of one another.

This invention relates to log handling equipment used in connection with a saw mill, and more particularly to an improved live deck and stop and loader assembly for use with a saw mill.

In the operation of a saw mill, it is common practice to maintain a supply of logs on a deck or ramp positioned on one side of the carriage of the saw mill, and to move the logs, one at a time, as needed, from the deck onto the carriage of the saw mill. The deck is conventionally a live deck in which a plurality of conveyor chains extend along the upper surface of the deck to support the logs. The chains are driven to move the logs across the upper surface of the deck to be discharged onto an inclined ramp, or skid bars, leading to the carriage of the saw mill.

A stop and loader assembly is conventionally positioned along the skid bars to prevent the logs from rolling freely from the live deck onto the saw mill carriage, and to discharge the logs one at a time as they are needed. Since the logs are very heavy, these conventional stop and loader assemblies necessarily must be both rugged and very securely anchored to prevent the impact of the logs, and the driving force of the chains, from forcing the stop and loader into the saw mill, Also, the heavy logs subject to the live deck conveyor chains, and consequently the driving mechanism, to severe impact or shock loads.

Accordingly, it is an object of this invention to provide an improved live deck and stop and loader assembly for use with a saw mill.

Another object is to provide such an assembly in which all loads applied to the stop and loader are contained with the live deck assembly.

Another object is to provide such an assembly including an improved drive mechanism for the live deck conveyor chains.

In the attainment of the foregoing and other objects, an important feature of the present invention resides in rotatably mounting the stop and loader assembly on the live deck conveyor chain drive shaft. A plurality of rocker arms are journaled for rotation about the drive shaft, with the rocker arms being rigidly joined for simultaneous rotation. A two-way fluid motor is mounted on the live deck frame structure to pivot the rocker arms about the drive shaft to alternately project their respective ends above the surface of the live deck to stop movement of a log from the live deck onto the skids or to feed an individual log from the deck, as desired.

The conveying mechanism of the live deck is driven independently of the stop and loader mechanism by a separate drive mechanism. This drive mechanism includes a reduction gear mounted directly on one end of the drive shaft for rotation about the longitudinal axis of the shaft. A drive motor is suitably connected to the reduction gear to permit rotation of the reduction gear within predetermined limits. Rotation of the reduction gear about the axis of the shaft is limited by elongated torque bar rigidly fixed to the housing of the reduction gear and extending therefrom into position to engage stop members mounted on the live deck frame assembly upon rotation of the reduction gear assembly. The torque bar is dimensioned for limited resiliently resisted deflection to act as a shock absorber for absorbing impact loads applied to the chains of the conveyor system.

Other objects and advantages of this invention will become apparent from the following specifications, taken with the drawings, in which:

FIG. 1 is a fragmentary side elevation view of a live deck and stop and loader assembly according to the present invention;

FIG. 4 is a sectional view taken on line 4—4 of FIG. 2; and,

FIG. 5 is a fragmentary section view taken on line 5—5 of FIG. 2.

Figures 2, 3:
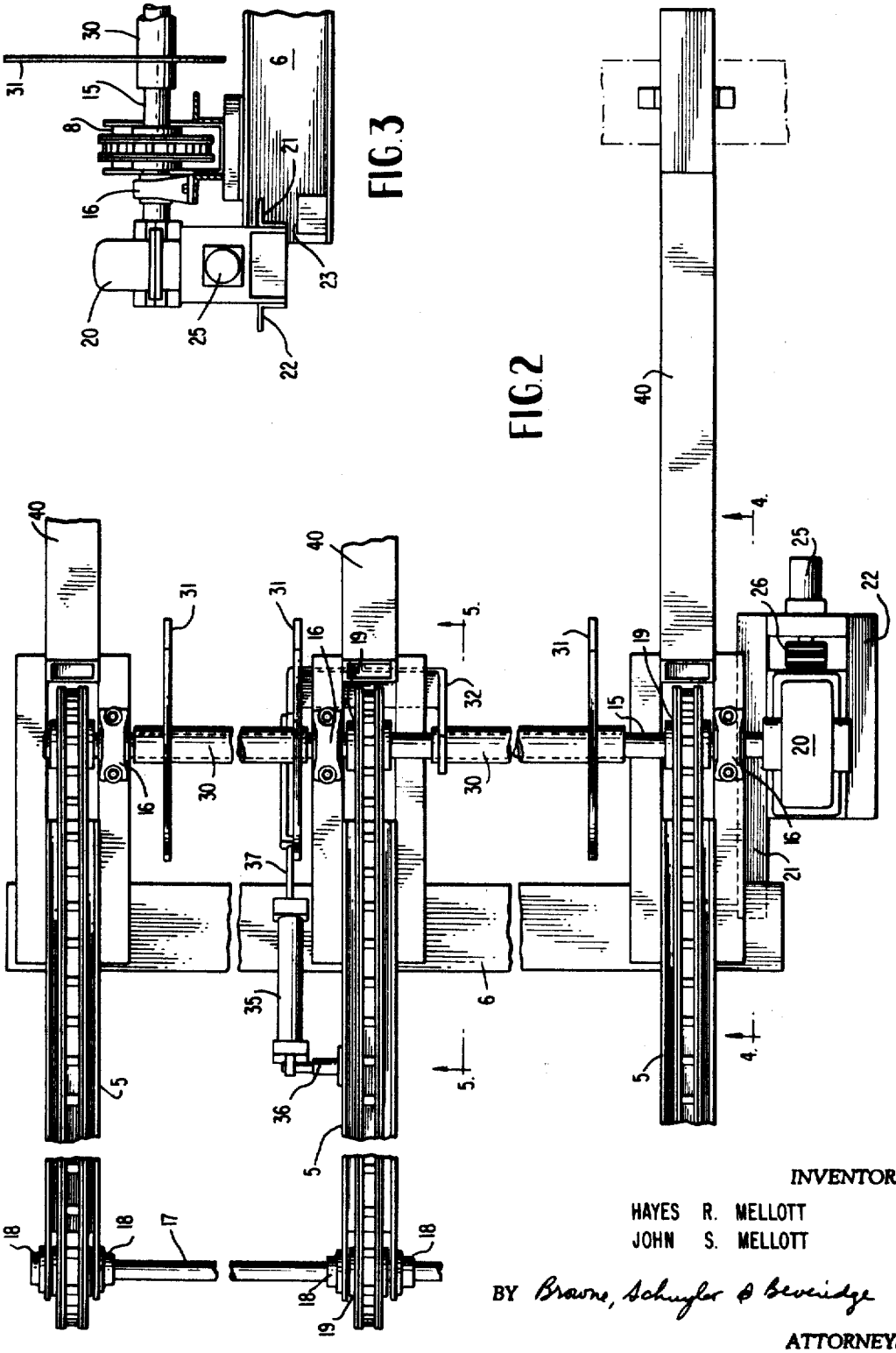
FIG. 2 is a fragmentary top plan view of the assembly shown in FIG. 1.
FIG. 3 is a fragmentary sectional view taken on line 3—3 of FIG. 1.

Referring now to the drawings in detail, a live deck and stop and loader assembly according to the present invention is indicated generally by the reference numeral 1 and includes a substantially horizontal live deck 2 and a stop and loader 3. The live deck 3 includes a log supporting platform 4 made up of a plurality of elongated structural beams 5 supported in substantially parallel laterally spaced relation by a suitable frame 6, which, in turn, is anchored to a suitable foundation 7, illustrated in phantom in the drawings. Beams 5 are formed with a channel 8 extending along their upper surface to guide and provide lateral support for conveyor chains 10 disposed in and moving along the channels, as more fully explained below. A wooden insert 11 is provided in the bottom of channel 8 to provide a slightly resilient support for the chain.

A drive shaft 15 is rotatably mounted, as by bearings 16, adjacent the edge of the platform 4 for rotation about an axis spaced below the upper surface of platform 4 and parallel to the carriage track (not shown) of the saw mill. An idler shaft 17 is similarly rotatably mounted, as by bearings 18, adjacent the side of platform 4 opposite shaft 15. A plurality of pairs of sprocket wheels 19 are mounted on shafts 15 and 17, with one sprocket wheel of each pair being mounted on the respective shafts 15 and 17 in alignment with one of the beams 5. A conveyor chain 10 is mounted on each of the pairs of sprocket wheels for movement thereon in an endless path with the upper run of the chain being positioned within the channel 8 of the associated beam 5. The chains 10 extend above the upper surface of the beams 5 to convey logs positioned thereon along the upper surface of platform 4.

Shaft 15 is driven by a reduction gear mechanism 20 mounted directly on and supported by one end of the shaft. Reduction gear 20 swings free on shaft 15, and is prevented from rotating about the axis of the shaft by an elongated torque bar 21 having one end rigidly supported by a frame 22 which, in turn, is fixedly secured to the housing of the reduction gear 20. The other end of the torque bar 21 projects outwardly beyond the housing of the reduction gear and is disposed between spaced stops 23 on the frame 6. Stops 23 are spaced apart a distance slightly greater than the thickness of torque bar 21 to permit a limited amount of free rotation of gear 20. Torque bar 21 is dimensioned for limited resiliently resisted deflection to act as a shock absorber or shock mount, to prevent damage to the gear mechanism due to impact loading resulting from logs being moved onto the chains 10, or by logs being stopped by the stop and loader mechanism 3 while the chains are still moving.

Suitable power means, such as fluid motor 25, is rigidly mounted on frame 22 for movement with reduction gear 20 about the axis of shaft 15. Motor 25 is operatively connected to reduction gear 20 by a suitable coupling means such as the flexible coupling 26.

The stop and loader mechanism 3 is mounted on the live deck 2 so that all loads applied to the stop and loader are contained with the deck assembly. The stop and loader includes a pair of hollow shafts 30 rotatably mounted on shaft 15 between adjacent beams 5. The separate shafts 30 each have one end rotatably fixed to a bracket 32 so that rotation of the bracket 32 imparts corresponding rotation to each of the shafts 30. A plurality of elongated rocker arms 32 are rigidly mounted, as by welding, to the shafts 30 for rotation therewith. The rocker arms 31 are of conventional construction and have their concave upper surfaces aligned along shaft 15.

A two-way hydraulic cylinder 35 has one end pivotally mounted, as by bracket 36 to one of the beams 5, and the free end of its piston rod 37 pivotally mounted to bracket 32 at a point spaced below shafts 30. Application of fluid pressure to the cylinder 35 will cause movement of piston rod 7 to reciprocate bracket 2 to pivot rocker arms 31 about the longitudinal axis of shaft 15. The extent of movement of piston rod 37 between its fully extended and retracted position is such as to project alternate ends of the rocker arms above the upper surface of platform 4.

As is most clearly seen in FIG. 1, when the ends 38 of rocker arms 31 which project outwardly from platform 4 toward the saw mill are in the raised position, they act as a positive stop for logs moving on chains 10. Once a log comes into contact with the rocker arm as illustrated in phantom in FIG. 1, actuation of the fluid cylinder 35 to pivot the rocker arms 31 about the longitudinal axis of shaft 15 will lower end 38 of rocker arm 31 and simultaneously raise end 39 to positively feed a single log from the live deck. At the same time, the end 39 of rocker arm 31 acts as a temporary stop to prevent additional logs from moving past the loader.

Logs fed from the stop and loader assembly 3 roll down inclined skid bars 40 onto the carriage of a saw mill.

In operation of the live deck and stop and loader assembly of this invention, logs are rolled onto the live deck as, for example, from a truck, over the idler shaft 17 onto the moving conveyer chains 10. Fluid motor 25, acting through reduction gear 20, drives shaft 15, and in turn, chains 10 to convey the logs along the upper surface of the log supporting platform 4 until the leading log comes into contact with the rocker arms 31 of the stop and loader assembly. Further operation of the motor 25 causes the chains 10 to slide beneath the logs stopped on the live deck.

When it is desired to feed a single log from the live deck down the skid bars 40 and onto the carriage of the saw mill, the mill operator actuates fluid cylinder 35 to pivot the rocker arms 31 about the longitudinal axis of shaft 15 to positively and forcibly feel a single log from the deck. Additional logs are prevented from moving over the feeding mechanism by the end 39 of the rocker arm which was raised simultaneously with lowering end 38 as the rocker arm was pivoted about shaft 15. Once the log has cleared the rocker arms 31, the fluid cylinder 35 is reversed to pivot arms 31 back into the position illustrated in FIG. 1 of the drawings to permit the next log on the chains 10 to move into position in engagement with the rocker arms to be fed when needed.

By mounting the stop and loader assembly for rotation on drive shaft 15, it is possible to maintain all of the loads applied to the stop and loader assembly within the frame of the live deck assembly, thereby eliminating the necessity for a separate frame and a foundation structure for the stop and loader assembly. Further, by mounting the stop and loader assembly directly on the drive shaft 15, setting up and installation of the saw mill is considerably simplified as all alignment problems are eliminated and the skid bars may be positioned directly onto the live deck without interference from the stop and loader assembly.

Since the logs handled by this apparatus are quite heavy, the apparatus is subjected to substantial shock or impact loading. For example, when a large log is rolled onto the chains 10, as from the bed of a truck, a substantial sudden increase in the load on the motor and reduction gear is encountered. Further, when logs supported on the chains come into contact with the rocker arms 31, a further sudden increase in load is applied due to the necessity of the chains sliding beneath the log.

The adverse effect of these impact loads on the motor and reduction gear mecharnism is substantially reduced by mounting the motor 25 and reduction gear 20 on the end of the shaft in the manner described. For example, under no load or light load conditions the weight of the motor and reduction gear mechanism is sufficient to prevent the reduction gear from being rotated about shaft 15 by the actuation of the motor 25. However, the application of a sudden load to the chains will result in a temporary stopping of the chains 10 as the motor and reduction gear rotate about the axis of the shaft to bring the end of the torque bar 21 into contact with stop 23. Continued operation of motor 25 will be resisted by torque arm 21 so that the conveyor chain 10 will again be driven along the upper surface of platform 4. Since torque arm 21 is dimensioned for limited resiliently resisted deflection, any adverse effect of the arm being brought suddenly into contact with stop 3 is eliminated.

By mounting the motor and reduction gear assembly directly onto the end of drive shaft 15, any problem of alignment of the reduction gear with the shaft or of the motor with the reduction gear is eliminated. Also, any shifting or deforming of the shaft or platform is automatically compensated for by the drive mechanism moving with the driven shaft.

While I have disclosed a preferred embodiment of my invention I wish it understood that I do not intend to be restricted solely thereto, but that I do intend to cover all embodiments thereof which would be apparent to one skilled in the art and which come within the spirit and scope of my invention.

What is claimed is:

1. A live deck and stop and loader assembly for a saw mill comprising, a log supporting platform positioned to one side of a carriage track of the saw mill, a drive shaft rotatably mounted on said platform substantially parallel to the carriage track, said drive shaft being positioned below the top surface of said platform on the side thereof adjacent the carriage track, a log stop and loader journaled for limited pivotal rotation on said drive shaft, said stop and loader including an elongated rocker arm having a concave upper surface, and power means for rotating said rocker arm for pivotal movement on said shaft to alternately elevate the respective ends thereof above said platform to feed logs individually onto the carriage of the saw mill, [an idler shaft] *chain guide means* mounted at the side of said platform opposite said one side, a plurality of sprocket wheels mounted on said drive shaft [and on said idler shaft], a plurality of endless conveyer chains mounted on and extending between the sprocket wheels on said drive [and idler shafts] *shaft and said chain guide means* with the upper portion of said chains [between said shafts] extending over and supported by the upper surface of said platform, and motor means for driving said drive shaft and said conveyor chains to move logs along the upper surface of said platform toward the carriage track and into engagement with said log stop and loader.

2. A live deck and stop and loader assembly for a saw mill comprising, a log supporting platform positioned to one side of carriage track of the saw mill, a drive shaft rotatably mounted on said platform substantially parallel to the carriage track, said drive shaft being positioned below the top surface of said platform on the side thereof adjacent the carriage track, a log stop and loader journaled for limited pivotal rotation on said drive shaft, said stop and loader including a plurality of elongated rocker arms spaced along said drive shaft in rotatably fixed relation to one another, and power means for rotating said rocker arms for pivotal movement on said shaft to alternately elevate the respective ends of said arms above said platform to intermittently feed logs individually from said platform onto the carriage of the saw mill, [an idler shaft] *chain guide means* mounted at the side of said platform opposite said one side, a plurality of sprocket wheels mounted on said drive shaft [and said idler shaft], a plurality of endless conveyer chains mounted on and extending between the sprocket wheels on said drive [and idler shafts] *shaft and said chain guide means* with the upper portion of said chains [between said shafts] extending over and supported by the upper surface of said platform, and means separate from said power means for driving said drive shaft and said conveyer chains to move logs along the upper surface of said platform toward the carriage track and into engagement with said stop and loader.

3. A live deck and stop and loader assembly according to claim 2 wherein said means for driving said drive shaft includes a reduction gear mechanism mounted on and operatively connected to one end of said drive shaft, said reduction gear mechanism being rotatable about the axis of said drive shaft, motor means for driving said reduction gear mechanism to rotate said drive shaft, and stop means for positively limiting the extent of rotation of said reduction gear mechanism about said axis.

4. A live deck and stop and loader assembly for a saw mill comprising, a log supporting platform positioned to one side of the carriage track of the saw mill, a drive shaft rotatably mounted on said platform substantially parallel to the carriage track, said drive shaft being positioned below the top surface of said platform on the side thereof adjacent the carriage track, a log stop and loader journaled for rotation on said drive shaft, said stop and loader including a plurality of elongated rocker arms spaced along said drive shaft in rotatably fixed relation to one another, and power means for rotating said rocker arms for pivotal movement on said shaft to alternately elevate the ends of said arms above said platform to intermittently feed logs individually from said platform onto the carriage of the saw mill, [an idler shafts] *chain guide means* mounted at the side of said platform opposite said one side, a plurality of sprocket wheels mounted on said drive shaft [and said idler shaft], a plurality of endless conveyer chains mounted on and extending between the sprocket wheels on said drive [and idler shafts] *shaft and said chain guide means* with the upper portion of said chains [between said shafts] extending over and supported by the upper surface of said platform, drive means separate from said power means for driving said drive shaft and said conveyer chains to move logs along the upper surface of said platform toward the carriage track and into engagement with said stop and loader, said drive means including a reduction gear mechanism mounted on and operatively connected to one end of said drive shaft, said reduction gear mechanism being rotatable about the axis of said drive shaft, motor means for driving said reduction gear mechanism, and means including a torque bar extending between said reduction gear mechanism and said platform for limiting the extent of rotation of said reduction gear mechanism about said axis, said torque bar being dimensioned for limited resiliently resisted deflection to reduce the adverse effect of shock loads on said reduction gear mechanism.

5. A live deck and stop and loader assembly according [of] *to* claim 4 wherein said motor means is mounted on said reduction gear mechanism for rotation therewith about the axis of said drive shaft.

References Cited

The following references, cited by the Examiner, are of record in the patented file of this patent or the original patent.

UNITED STATES PATENTS

| | | | |
|---|---|---|---|
| 1,741,951 | 12/1929 | Pelton | 143—96 X |
| 2,396,255 | 3/1946 | Edwards et al. | 143—92 X |
| 2,484,362 | 10/1949 | Weber | 143—95 X |
| 2,666,462 | 1/1954 | Richardson | 143—96 |
| 3,080,042 | 3/1963 | Sherman | 198—34 |
| 3,308,968 | 3/1967 | Harrington | 198—34 |

ALBERT J. MAKAY, *Primary Examiner.*